(12) United States Patent
Cho et al.

(10) Patent No.: US 12,525,321 B2
(45) Date of Patent: Jan. 13, 2026

(54) METHOD AND DEVICE FOR DESIGNING TARGET-SPECIFIC DRUG IN WHICH DEEP-LEARNING ALGORITHM IS COMBINED WITH WATER PHARMACOPHORE MODEL

(71) Applicants: INCEREBRO CO., LTD., Seoul (KR); KOREA UNIVERSITY RESEARCH AND BUSINESS FOUNDATION, SEJONG CAMPUS, Sejong-si (KR)

(72) Inventors: Eun Sung Cho, Seoul (KR); Minsup Kim, Seoul (KR); Kichul Park, Seoul (KR); Wonsang Kim, Seoul (KR)

(73) Assignees: INCEREBRO CO., LTD., Seoul (KR); KOREA UNIVERSITY RESEARCH AND BUSINESS FOUNDATION, SEJONG CAMPUS, Sejong-si (KR)

( * ) Notice: Subject to any disclaimer, the term of this patent is extended or adjusted under 35 U.S.C. 154(b) by 1249 days.

(21) Appl. No.: 17/346,865

(22) Filed: Jun. 14, 2021

(65) Prior Publication Data
US 2022/0246239 A1 Aug. 4, 2022

(30) Foreign Application Priority Data
Jan. 29, 2021 (KR) .................. 10-2021-0012835

(51) Int. Cl.
| | | |
|---|---|---|
| G01N 33/48 | (2006.01) | |
| C12N 15/10 | (2006.01) | |
| G06F 30/27 | (2020.01) | |
| G06N 3/08 | (2023.01) | |
| G16B 5/20 | (2019.01) | |
| G16B 35/10 | (2019.01) | |
| G16B 40/00 | (2019.01) | |
| G16C 10/00 | (2019.01) | |
| G16C 20/62 | (2019.01) | |
| G16C 20/70 | (2019.01) | |
| G16H 50/20 | (2018.01) | |
| G16H 70/40 | (2018.01) | |

(52) U.S. Cl.
CPC ......... *G16B 35/10* (2019.02); *C12N 15/1089* (2013.01); *G06F 30/27* (2020.01); *G06N 3/08* (2013.01); *G16B 5/20* (2019.02); *G16B 40/00* (2019.02); *G16C 10/00* (2019.02); *G16C 20/62* (2019.02); *G16C 20/70* (2019.02); *G16H 50/20* (2018.01); *G16H 70/40* (2018.01)

(58) Field of Classification Search
None
See application file for complete search history.

(56) References Cited

U.S. PATENT DOCUMENTS

2022/0036966 A1* 2/2022 Meyers .................. G16B 15/30

FOREIGN PATENT DOCUMENTS

KR 10-2016-0128288 A 11/2016

OTHER PUBLICATIONS

Ghanbarpour, Ahmadreza, Amr H. Mahmoud, and Markus A. Lill. "On-the-fly prediction of protein hydration densities and free energies using deep learning." arXiv preprint arXiv:2001.02201 (2020).*
Grow C. et al., Generative network complex (GNC) for drug discovery, Department of Mathematics, Michigan State University, MI 48824, USA; Department of Electrical and Computer Engineering, Michigan State University, MI 48824, USA; Department of Biochemistry and Molecular Biology, Michigan State University, MI 48824, USA, Nov. 1, 2019, 22 pages.

* cited by examiner

*Primary Examiner* — Anna Skibinsky
(74) *Attorney, Agent, or Firm* — Kilpatrick Townsend & Stockton LLP

(57) ABSTRACT

The present disclosure relates to a method and device for designing a target-specific drug in which a deep learning algorithm is combined with a water pharmacophore model. More particularly, the present disclosure relates to a device and method for generating the library of novel compounds by securing specificity to a target protein through a water pharmacophore (WP) model, and then performing deep learning.

12 Claims, 9 Drawing Sheets

FIG. 7

| 700 | | Step 1. Water pharmacophore screening 750 | | | Step 2. Chemical generation using deep learning | Step 3. Water pharmacophore rescreening 760 | | |
|---|---|---|---|---|---|---|---|---|
| Target | Number of screening database | Criteria (tolerance/matching) | Number of screened compounds | hit rate¹ (%) | Number of training compounds / Number of generated compounds | Criteria (tolerance/matching) | Number of screened compounds | hit rate² (%) |
| AR | 12,954,474 | 1.5Å / 4 of 4 | 86,586 | 0.67 | 86,586 / 100,000 | 1.5Å / 4 of 4 | 26,268 | 26.27 |
| GR | 12,954,474 | 1.5Å / 4 of 4 | 608,315 | 4.70 | 100,000 / 100,000 | 1.5Å / 4 of 4 | 13,005 | 12.01 |
| PR | 12,954,474 | 1.5Å / 4 of 6 | 99,821 | 0.77 | 99,821 / 100,000 | 1.5Å / 4 of 6 | 22,322 | 22.32 |
|  | 12,954,474 | 1.5Å / 5 of 6 | 950 | 0.01 |  | 1.5Å / 5 of 6 | 584 | 0.58 |
|  | 12,954,474 | 1.5Å / 6 of 6 | 0 | 0.00 |  | 1.5Å / 6 of 6 | 1 | 0.00 |
| PARP | 12,954,474 | 2.0Å / 4 of 5 | 23,026 | 0.18 | 23,026 / 100,000 | 2.0Å / 4 of 5 | 25,719 | 25.72 |
|  | 12,954,474 | 2.0Å / 5 of 5 | 599 | 0.00 |  | 2.0Å / 5 of 5 | 618 | 0.62 |
|  | 12,954,474 | 1.5Å / 4 of 5 | 3526 | 0.03 |  | 1.5Å / 4 of 5 | 7,771 | 7.77 |
|  | 12,954,474 | 1.5Å / 5 of 5 | 63 | 0.00 |  | 1.5Å / 5 of 5 | 37 | 0.04 |
| AChE | 12,954,474 | 2.0Å / 4 of 6 | 60,677 | 0.47 | 60,677 / 100,000 | 2.0Å / 4 of 6 | 16,280 | 16.28 |
|  | 12,954,474 | 2.0Å / 5 of 6 | 108 | 0.00 |  | 2.0Å / 5 of 6 | 222 | 0.22 |
|  | 12,954,474 | 1.5Å / 6 of 6 | 0 | 0.00 |  | 1.5Å / 6 of 6 | 0 | 0.00 |
|  | 12,954,474 | 1.5Å / 5 of 6 | 10 | 0.00 |  | 1.5Å / 5 of 6 | 18 | 0.02 |
|  | 12,954,474 | 1.5Å / 6 of 6 | 0 | 0.00 |  | 1.5Å / 6 of 6 | 0 | 0.00 |
| PPARγ | 12,954,474 | 1.5Å / 4 of 6 | 259,475 | 2.00 | 100,000 / 100,000 | 1.5Å / 4 of 6 | 31,135 | 31.14 |
|  | 12,954,474 | 1.5Å / 5 of 6 | 153 | 0.00 |  | 1.5Å / 5 of 6 | 173 | 0.17 |
|  | 12,954,474 | 1.5Å / 6 of 6 | 0 | 0.00 |  | 1.5Å / 6 of 6 | 0 | 0.00 |
|  | 12,954,474 | 2.0Å / 4 of 6 | 784,499 | 6.06 |  | 2.0Å / 4 of 6 | 56,358 | 56.36 |
|  | 12,954,474 | 2.0Å / 5 of 6 | 1,758 | 0.01 |  | 2.0Å / 5 of 6 | 1,270 | 1.27 |
|  | 12,954,474 | 2.0Å / 6 of 6 | 0 | 0.00 |  | 2.0Å / 6 of 6 | 0 | 0.00 |

*hit rate¹ = (Number of screening database / Number of screened compounds)*100
*hit rate² = (Number of screening database / Number of screened compounds)*100

FIG. 8

| Target | Average binding energies ||| Max active | Max Gen. | Gen. over active avg. | Gen. over active max. |
|---|---|---|---|---|---|---|---|
| | Active | Decoy | Gen. | | | | |
| AR | -9.47 (79) | -6.98 (2854) | -7.59 | -12.51 | -12.92 | 1149 | 1 |
| GR | -7.93 (78) | -6.79 (2947) | -7.22 | -11.88 | -12.16 | 3580 | 3 |
| PR | -7.27 (27) | -7.32 (1041) | -7.38 | -9.86 | -11.26 | 295 | 8 |
| PARP | -8.63 (35) | -6.37 (1351) | -8.07 | -10.34 | -10.36 | 5 | 1 |
| AChE | -10.42 (107) | -7.94 (3892) | -8.23 | -14.45 | -9.76 | 0 | 0 |
| PPARγ | -9.77 (85) | -8.75 (3127) | -6.99 | -14.27 | -9.48 | 0 | 0 |

| Target | Compounds over active avg. | Novel compounds in comparison to DUD active || Max. TC || Avg. TC ||
|---|---|---|---|---|---|---|---|
| | | RDKit (<0.70) | Morgan (<0.50) | RDKit | Morgan | RDKit | Morgan |
| AR | 1149 | 1123(0.97) | 1130 | 0.95 | 0.74 | 0.22 | 0.10 |
| GR | 3580 | 3548(0.99) | 3557 | 0.97 | 0.82 | 0.29 | 0.09 |
| PR | 295 | 293(0.99) | 294 | 0.84 | 0.53 | 0.24 | 0.10 |
| PARP | 5 | 5(1.00) | 5 | 0.59 | 0.23 | 0.41 | 0.10 |

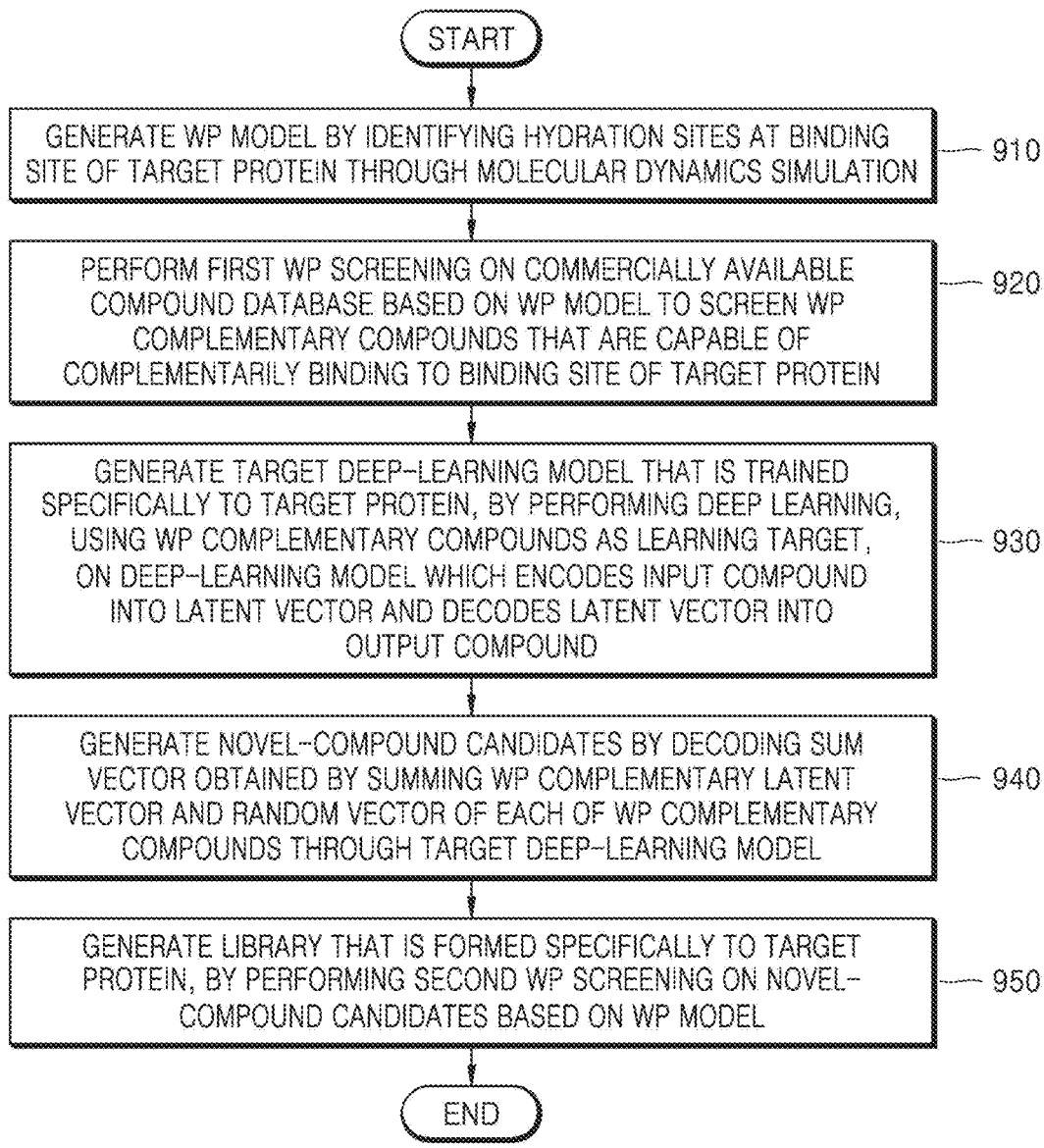

METHOD AND DEVICE FOR DESIGNING TARGET-SPECIFIC DRUG IN WHICH DEEP-LEARNING ALGORITHM IS COMBINED WITH WATER PHARMACOPHORE MODEL

CROSS-REFERENCE TO RELATED APPLICATION

This application is based on and claims priority under 35 U.S.C. § 119 to Korean Patent Application No. 10-2021-0012835, filed on Jan. 29, 2021, in the Korean Intellectual Property Office, the disclosure of which is incorporated by reference herein in its entirety.

BACKGROUND

1. Field

The present disclosure relates to a method and device for designing a target-specific drug in which a deep learning algorithm is combined with a water pharmacophore model. More particularly, the present disclosure relates to a device and method for generating the library of novel compounds by securing specificity to a target protein through a water pharmacophore (WP) model, and then performing deep learning.

2. Description of the Related Art

The development of novel drugs can be initiated from finding novel compounds that can act on target proteins, such as substances causing diseases in vivo. For example, when the library of novel compounds that have a structure capable of binding to a binding site of target proteins and that is not present in a commercially accessible database, is generated, the novel-drug development process may be performed based on the library.

Whether a specific compound has a structure capable of binding to a binding site of a target protein may be determined based on a pharmacopore. The pharmacopore refers to a pharmacological action group, and when a pharmacopore model of a target protein is identified, a compound that acts on the target protein can be identified on the basis of the identified model.

However, since information about an active compound of a target protein is required to establish a pharmacopore model of the target protein, the process of determining which compounds are capable of binding to a binding site of the target protein can be complicated.

Meanwhile, even when the structure of a compound that is capable of acting on the target protein is identified, only after a newly generating process for compounds that have the corresponding structure and that are not present in the commercial database, is performed, the library of novel compounds can be generated. However, it may be difficult to satisfy structural validity of newly generated compounds and to obtain diversity that the newly generated compounds do not overlap with existing materials.

SUMMARY

Embodiments of the present disclosure provide a technique for screening compounds having a structure capable of acting on a target protein without information on an active compound of the target protein and a technique for generating a novel compound that has a structure capable of acting on the target protein and is not present in existing database.

Additional aspects will be set forth in part in the description which follows and, in part, will be apparent from the description, or may be learned by practice of the presented embodiments of the disclosure.

According to one or more embodiments, a device for designing a target-specific drug, includes: a memory to store instructions; and a processor configured to, by executing the instructions: generate a water pharmacophore (WP) model by identifying hydration sites at a binding site of a target protein through molecular dynamics simulation; perform a first WP screening on commercially available compound database based on the WP model to screen WP complementary compounds that are capable of complementarily binding to the binding site of the target protein; generate a target deep-learning model that is trained specifically to the target protein, by performing deep learning, using the WP complementary compounds as a learning target, on a deep-learning model that inputs a compound group in a one-hot encoding manner to express the same as a latent vector, which is then decoded in a one-hot form and outputs the result; generate novel-compound candidates by decoding a sum vector obtained by summing a WP complementary latent vector and a random vector of each of the WP complementary compounds through the target deep-learning model; and generate a library that is formed specifically to the target protein, by performing a second WP screening on the novel-compound candidates based on the WP model.

According to one or more embodiments, a method of designing a target-specific drug, which is performed by a processor executing instructions stored in a memory, includes: generating a water pharmacophore (WP) model by identifying hydration sites at a binding site of a target protein through molecular dynamics simulation; performing a first WP screening on commercially available compound database based on the WP model to screen WP complementary compounds that are capable of complementarily binding to the binding site of the target protein; generating a target deep-learning model that is trained specifically to the target protein, by performing deep learning, using the WP complementary compounds as a learning target, on a deep-learning model which encodes an input compound into a latent vector and decodes the latent vector into an output compound; generating novel-compound candidates by decoding a sum vector obtained by summing a WP complementary latent vector and a random vector of each of the WP complementary compounds through the target deep-learning model; and generating a library that is formed specifically to the target protein, by performing a second WP screening on the novel-compound candidates based on the WP model.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 shows a diagram illustrating the results of a first WP screening and a second WP screening according to some embodiments;

FIG. 8 shows a diagram illustrating a method of verifying novel target-specific compounds constituting a library according to an embodiment of the present disclosure; and FIG. 9 shows a flowchart illustrating operations constituting a method of designing a target-specific drug according to an embodiment of the present disclosure.

DETAILED DESCRIPTION

Figure 1:
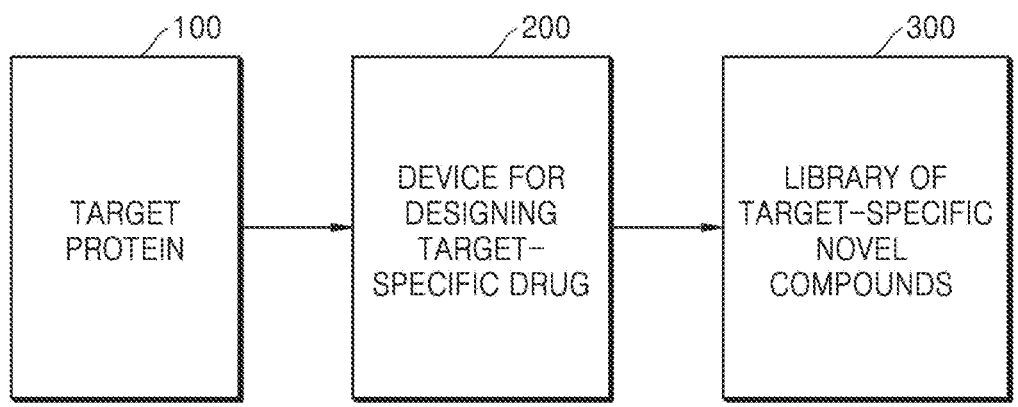
FIG. 1 shows a diagram illustrating a system for generating the library of novel compounds specific to a target protein according to some embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Hereinafter, embodiments of the present disclosure will be described in detail with reference to the drawings. The following description is provided only to embody the embodiments and is not intended to limit the scope of the present disclosure. The matter that one of ordinary skill in the technical field associated with the present disclosure could easily infer from the detailed descriptions and embodiments, should be construed as belonging to the right range according to the present disclosure.

Although the terms used in the present disclosure are described as general terms widely used in the technical field of the present disclosure, the meaning of the terms used in the present disclosure may vary depending on the intention of a technician who is concerned in the corresponding field, the appearance of novel technology, an examination standard, or a precedent. Some terms may be arbitrarily selected by an applicant, and in this case, the meaning of the arbitrarily selected terms will be described in detail. The terms used in the present disclosure should be interpreted as having not only a dictionary meaning but also a meaning reflecting the overall context of the specification.

Terms such as 'configured' or 'including' used in the present disclosure should not be construed as necessarily including all of the elements or operations described in the specification, and should be construed as having the following cases: when some elements or operations are not included and when additional elements or operations are further included.

The terms including ordinal numbers such as 'first' or 'second' used in the present disclosure may be used to describe various elements or operations, but the corresponding elements or operations should not be limited by the ordinal numbers. The terms including ordinal numbers should be interpreted only to distinguish one element or operation from other elements or operations.

Hereinafter, embodiments of the present disclosure will be described in detail with reference to the drawings. Detailed descriptions of matters that are well known to one of ordinary in the art will be omitted.

FIG. 1 shows a diagram illustrating a system 10 for generating a library 300 of novel compounds specific to a target protein 100 according to some embodiments.

Referring to FIG. 1, the system 10 for generating the library 300 of novel compounds specific to the target protein 100 may include the target protein 100, a device 200, and the library 300 of novel compounds specific to the target protein 100.

In the system 10, the target protein 100 may be input to the device 200, and through operations therefor, the library 300 may be output from the device 200. In this case, the library 300 may include novel compounds that specifically bind to or act on the target protein 100.

The target protein 100 may refer to a disease-causing material which is targeted when the library 300 is generated. In the system 10, the library 300 specific to the target protein 100 may be generated to develop a novel drug for a disease caused by the target protein 100.

For example, the target protein 100 may have the crystal structure of any one of androgen receptor (AR), glucocorticoid receptor (GR), progesterone receptor (PR), poly ADP-ribose polymerase (PARP), acetylcholinesterase (AChE), and peroxisome proliferator-activated receptor-gamma (PPARγ).

The device 200 may generate the library 300 from the target protein 100 by using a water pharmacophore (WP) model and deep learning (DL). The WP model formed with respect to the target protein 100 may be used to reveal a structure that specifically binds to or act on the target protein 100, and the deep learning may be used to generate a novel compound by randomly modifying a known compound structure. For example, a deep-learning model such as a sequence-to-sequence (seq2seq) model may be used.

The WP model formed with respect to the target protein 100 may refer to a model generating a pharmacopore feature based on a hydration site at a binding site of the target protein 100. When WP features are identified at the binding site of the target protein 100 according to the WP model, it may be determined based on the WP features which compounds are capable of binding specifically to or acting on the target protein 100.

The WP model is a technology that is designed by applying a pharmacopore model to a WaterMap technology of Schrœdinger Inc. that determines a hydration site by molecular dynamics. According to the WP model, WP features may be allocated to respective hydration sites based on thermodynamic characteristics of the hydration sites. In one or more embodiments, in the case where the WP model is used, the specificity to the target protein 100 may be determined based on the molecular dynamics and the thermodynamic properties. Accordingly, when the specificity to the target protein 100 is determined, information about an active compound of the target protein 100 may not be required.

Figure 2:
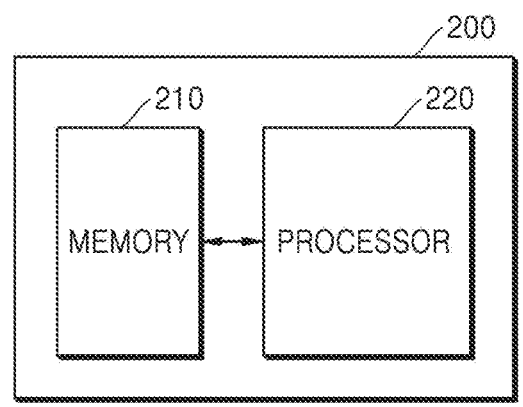
FIG. 2 shows a block diagram illustrating elements of a device for designing a target-specific drug according to an embodiment.

FIG. 2 shows a block diagram illustrating elements of the device 200 for designing a target-specific drug according to an embodiment.

Referring to FIG. 2, the device 200 for designing a target-specific drug may include a memory 210 and a processor 220. However, embodiments of the present disclosure is not limited thereto, and other general-purpose elements besides the elements illustrated in FIG. 2 may be further included in the device 200.

The device 200 may receive the input of the target protein 100 and generate the library 300 through operations therefor. The data input/output and operations therefor may be performed by the processor 220 executing instructions stored in the memory 210.

The device 200 may be a computing device which receives the input of the target protein 100 and generates the library 300. The data input/output and operations therefor performed in the device 200 may be implemented by a mobile and/or web application or a computer program. For example, the device 200 may be implemented as a PC, a smart phone, or a tablet PC. However, embodiments of the present disclosure are not limited thereto, and the device 200 may be implemented as various electronic devices having processing performance.

The device 200 may include the memory 210 as an element for storing various data, instructions, at least one program or software, and the processor 220 as an element for performing processing on various data by executing instructions or at least one program.

The memory 210 may store various instructions for generating the library 300 by receiving the input of the target protein 100. For example, the memory 210 may store instructions constituting a computer program or software such as a mobile and/or web application. Also, the memory 210 may store various data required to execute an application or a program.

The memory 210 may be embodied as a non-volatile memory such as ROM, PROM, EPROM, EEPROM, flash memory, PRAM, MRAM, RRAM, and FRAM, or a volatile memory such as DRAM, SRAM, SDRAM, PRAM, RRAM, and FeRAM. Also, the memory 210 may be implemented as a hard disk drive (HDD), a solid state drive (SSD), a secure digital (SD), a Micro-SD, etc.

The processor 220 may perform, by executing instructions stored in the memory 210, a series of operations for generating the library 300 by receiving the input of the target protein 100. Also, the processor 220 may perform an overall function for controlling the device 200, and may process various computing operations in the device 200.

The processor 220 may be embodied as an array of a plurality of logic gates or a general-purpose microprocessor. The processor 220 may be configured to include a single processor or a plurality of processors. The processor 220 may be integrally formed with the memory 210, rather than being separately formed from the memory 210 for storing instructions. For example, the processor 220 may be implemented in the form of at least one of a CPU, a GPU, and an AP included in the device 200.

The processor 220 may identify, by executing instructions stored in the memory 210, hydration sites at the binding site of the target protein 100 through molecular dynamics simulation to generate the WP model.

The molecular dynamics simulation for identifying hydration sites at the binding site of the target protein 100 is a computer simulation for analyzing the physical movement of molecules and atoms constituting the target protein 100, and may be, for example, software such as AMBER, DESMOND, or GROMACS.

When the hydration sites are identified at the binding site of the target protein 100 by the molecular dynamics simulation, a WP model based on hydration sites may be generated. In one or more embodiments, as described below, a WP feature may be assigned to each hydration site in consideration of thermodynamic properties.

The processor 220 may perform, by executing instructions stored in the memory 210, a first WP screening on commercially available compound database based on the WP model to screen WP complementary compounds that are capable of complementarily binding to the binding site of the target protein 100.

The WP complementary compounds may refer to compounds that are capable of complementarily binding to a binding site of the target protein 100, that is, compounds specific to the target protein 100. Whether being specific to the target protein 100, may be determined by the WP model. For example, being the WP complementary compound may be determined based on WP features of the WP model, which will be described.

WP complementary compounds may be screened by a first WP screening on commercially available compound database. The commercially available compound database is commercially accessible compound database, for example, ZINC15 database.

The first WP screening may refer to the process of screening compounds of the commercially available compound database based on the WP model. For example, the first WP screening may be performed on compounds having molecular weights of 200 to 500 and a log P value of −1 to 5 in the ZINC15 database. Meanwhile, the first WP screening may be performed by Phase, which is a pharmacopore modeling program manufactured by Schrœdinger Inc.

Since compounds complementary to the binding site of the target protein 100 may be screened as WP complementary compounds based on the WP model, novel compounds generated by deep learning performed on the WP complementary compounds may have specificity to the target protein 100.

The processor 220 may generate, by executing instructions stored in the memory 210, a target deep-learning model that is trained specifically to the target protein 100 by performing deep-learning training, using the WP complementary compounds as a learning target, on a deep-learning model that encodes an input compound into a latent vector and decodes the latent vector into an output compound.

The deep-learning model may be a recurrent neural network (RNN) having an encoding module for encoding an input compound into a transfer vector and a decoding module for decoding the transfer vector into an output compound. The deep learning performed on the deep-learning model may refer to, as described below, training in such a way that, with respect to all of the WP complementary compounds, when a certain WP complementary compound is input, it is derived to output a corresponding WP complementary compound.

According to the deep learning, a deep-learning model may be trained into a target deep-learning model specific to the target protein 100. Since the deep-learning model is trained using, as a learning target, WP complementary compounds specific to the target protein 100, a target deep-learning model generated as a result of the training may also have specificity to the target protein 100. That is, whenever the target protein 100 is input, a target deep-learning model newly trained in response thereto, may be generated.

The processor 220 may generate, executing instructions stored in the memory 210, novel-compound candidates by decoding a sum vector obtained by summing a WP complementary latent vector and a random vector of each of the WP complementary compounds through the target deep-learning model.

Like the deep-learning model before training, the target deep-learning model may have an encoding module for encoding an input compound into a latent vector and a decoding module for decoding a sum vector. At this time, when decoding is performed after transformation is performed on a latent vector obtained by encoding each of the WP complementary compounds, that is, a WP complementary latent vector, modified compounds which are different from the WP complementary compounds may be output. The modified compounds may be novel-compound candidates that are candidates for novel compounds to be stored in the library 300.

The transformation of the WP complementary latent vector may be performed by a random vector. As described below, when a random vector according to a Gaussian random distribution is added to a WP complementary latent vector to generate a sum vector, and then the sum vector is decoded, novel-compound candidates, to which a random structural transformation is applied and which maintains specificity to the target protein 100, may be generated.

In the case where novel-compound candidates are generated by the target deep-learning model, when the randomness of the random vector is excessively large, the validity of the compound structure of the novel-compound candidates may be lowered, and when the randomness is excessively small, novel-compound candidates having the same structure may be repeatedly generated, leading to a decrease in diversity. Accordingly, as will be described later, in order to adjust validity and diversity to be at an appropriate level, a degree of randomness of a random vector in a target deep-learning model may be adjusted.

The processor 220 may generate, by executing instructions stored in the memory 210, the library 300 that is specific to the target protein 100 by performing a second WP screening on the novel-compound candidates based on a WP model.

Since the novel-compound candidates generated by the target deep-learning model are generated by random modification, an additional screening may be required to generate a more appropriate library. Accordingly, when the second WP screening is performed based on the criteria that is different from that of the first WP screening, from among the novel-compound candidates, only desired compounds may be screened as a novel compound to form the library 300.

As described above, since, in the device 200, the specificity to the target protein 100 may be secured by the WP model and then, the deep learning process is performed, the library 300 of novel compounds that retain the specificity to the target protein 100 can be generated. Accordingly, thereafter, procedures of developing a novel drug for the target protein 100 may be performed by using the library 300.

Figure 3:
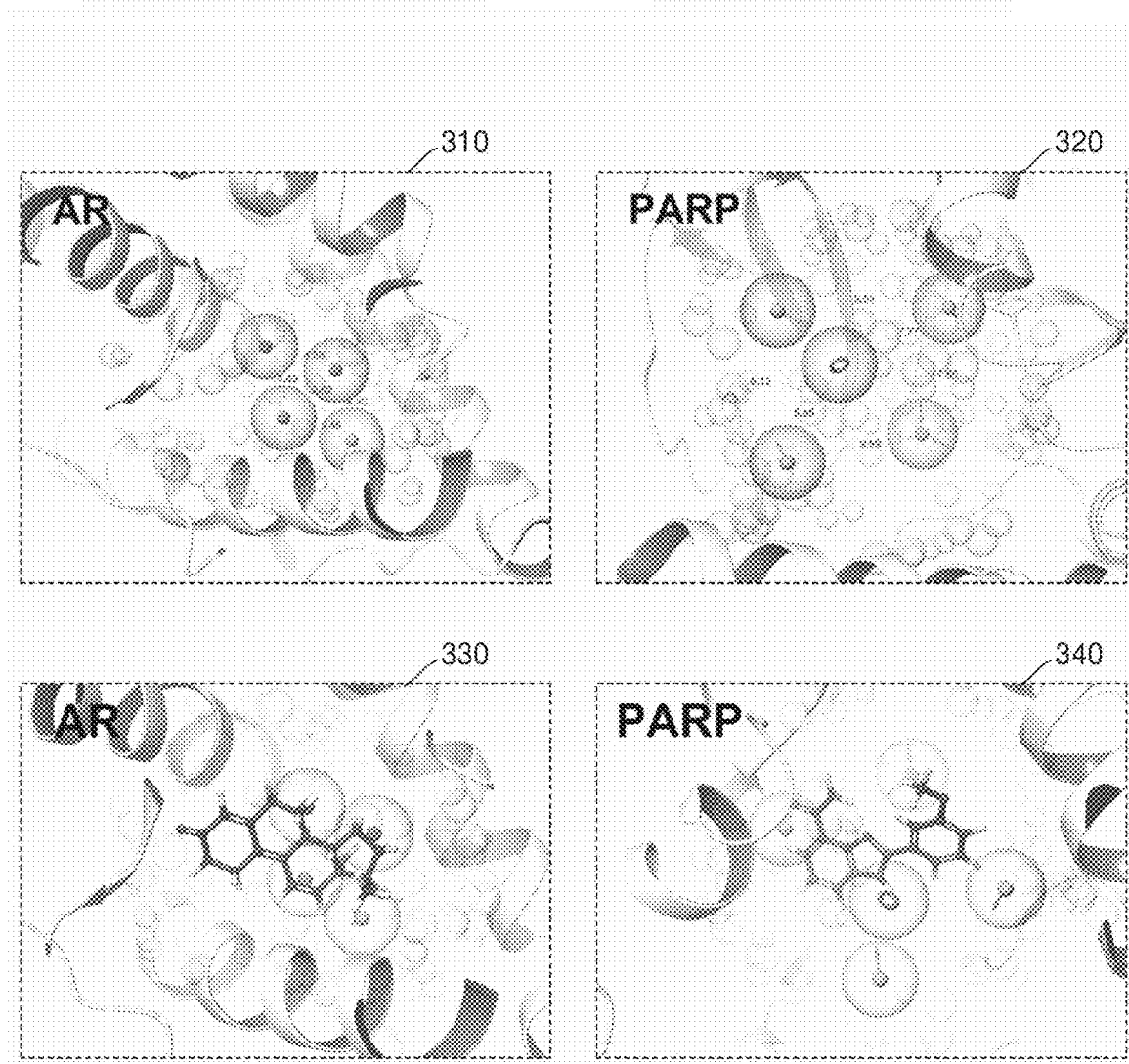
FIG. 3 shows a diagram illustrating a water pharmacophore (WP) model generated with respect to a target protein according to an embodiment of the present disclosure.

FIG. 3 shows a diagram illustrating a WP model 310 generated with respect to a target protein according to an embodiment of the present disclosure.

Referring to FIG. 3, the WP model 310 corresponding the case where the target protein 100 is an android receptor (AR), and a WP model 320 corresponding the case where the target protein 100 is a poly ADP-ribose polymerase (PARP) are illustrated, and a WP model 330 corresponding the case where an inhibitor binds to the WP model 310, and a WP model 340 corresponding the case where an inhibitor binds to the WP model 320 are illustrated.

In view that a known inhibitor molecule for AR and a known inhibitor molecule for PARP stably bind to the binding site of AR and the binding site of PARP, respectively, in the WP model 310 and the WP model 320, it may be evaluated that the AR molecule and the PARP molecule are appropriately modeled by the WP model 310 and the WP model 320, respectively.

The WP model 310 and the WP model 320 may include WP features assigned to the hydration sites at the binding sites of AR and PARP, respectively. The green sphere illustrated in the WP model 310 may indicate a hydrophobic feature, the blue sphere illustrated in the WP model 310 may indicate a hydrogen bond donor, the orange ring illustrated in the WP model 320 may indicate an aromatic feature, and the red sphere illustrated in the WP model 320 may indicate a hydrogen bond acceptor.

Also, in the WP model 310 and the WP model 320, transparent spheres each having a WP feature at the center thereof may refer to a tolerance of the feature, and blue transparent spheres may refer to excluded volumes in which the WP features are not assigned at the binding sites.

WP features, such as positive charge features, negative charge features, hydrophobic features, aromatic features, hydrogen bond acceptors, and hydrogen bond donors, may be assigned based on the thermodynamic properties of the hydration sites at the binding sites of the target protein 100. That is, when generating the WP model, the processor 220 may calculate the thermodynamic properties of the hydration sites, and may assign WP features to the hydration sites based on the thermodynamic properties.

As described above, in the process of generating the WP features constituting the WP model of the target protein 100, the molecular dynamics simulation for identifying the hydration sites and the thermodynamic properties calculation about the hydration sites are performed. Accordingly, unlike the existing pharmacopore model, information about the active compound of the target protein 100 may not be required.

Meanwhile, the thermodynamic properties used to determine whether to allocate a WP feature to each of the hydration sites may include energy characteristics, entropy characteristics, and hydrogen bonding characteristics of the hydration sites. Further, the WP features allocated based on the thermodynamic properties may include positive charge features, negative charge features, hydrophobic features, aromatic features, a hydrogen bond acceptor, and a hydrogen bond donor, as described above.

Regarding WP models such as the WP model 310 and the WP model 320, the first WP screening may be performed on commercially available compound database. In an embodiment, when WP complementary compounds are screened, the processor 220 may perform the first WP screening based on the tolerances of the WP features and the matching number.

The tolerance refers to an inter-molecular distance represented by a transparent sphere in the WP model 310 and the WP model 320, and may be set to be any one value of 1.0 Å, 1.5 Å, 2.0 Å, and 2.5 Å. As the value of the tolerance is set to be large, the screening criteria may be alleviated, and the number of WP complementary compounds screened by the first WP screening may be increased.

The matching number may refer to the number of WP features of the target protein 100 that match the WP features of a to-be-screened compound included in commercially available compound database. The matching among the WP features may refer to a case in which on the 3D conformal structure, the distance between the WP features is smaller than the tolerance, i.e., the WP features overlap each other. As the matching number required for the first WP screening increases, the screening criteria may be enhanced and the number of WP complementary compounds screened by the first WP screening may be decreased.

As described above, since the number of WP complementary compounds screened by the first WP screening may be changed according to the tolerance and the matching number, the tolerance and the matching number may be adjusted such that the number of WP complementary compounds is within a certain range according to the type of the target protein 100.

For example, the tolerance and the matching number may be adjusted such that the WP complementary compounds are screened in such an amount that is equal to or greater than 20,000 and equal to or less than 100,000 depending on the type of the target protein 100. That is, to generate a plurality of novel compounds through the deep learning process, the lower limit of the number of the WP complementary compounds may be set to be 20,000, and to prevent excessive integration and reduce the amount of calculation, the upper limit of the number of the WP complementary compounds may be set to be 100,000. However, this is only an example, and the upper and lower values may be changed according to a design change.

Figure 4:
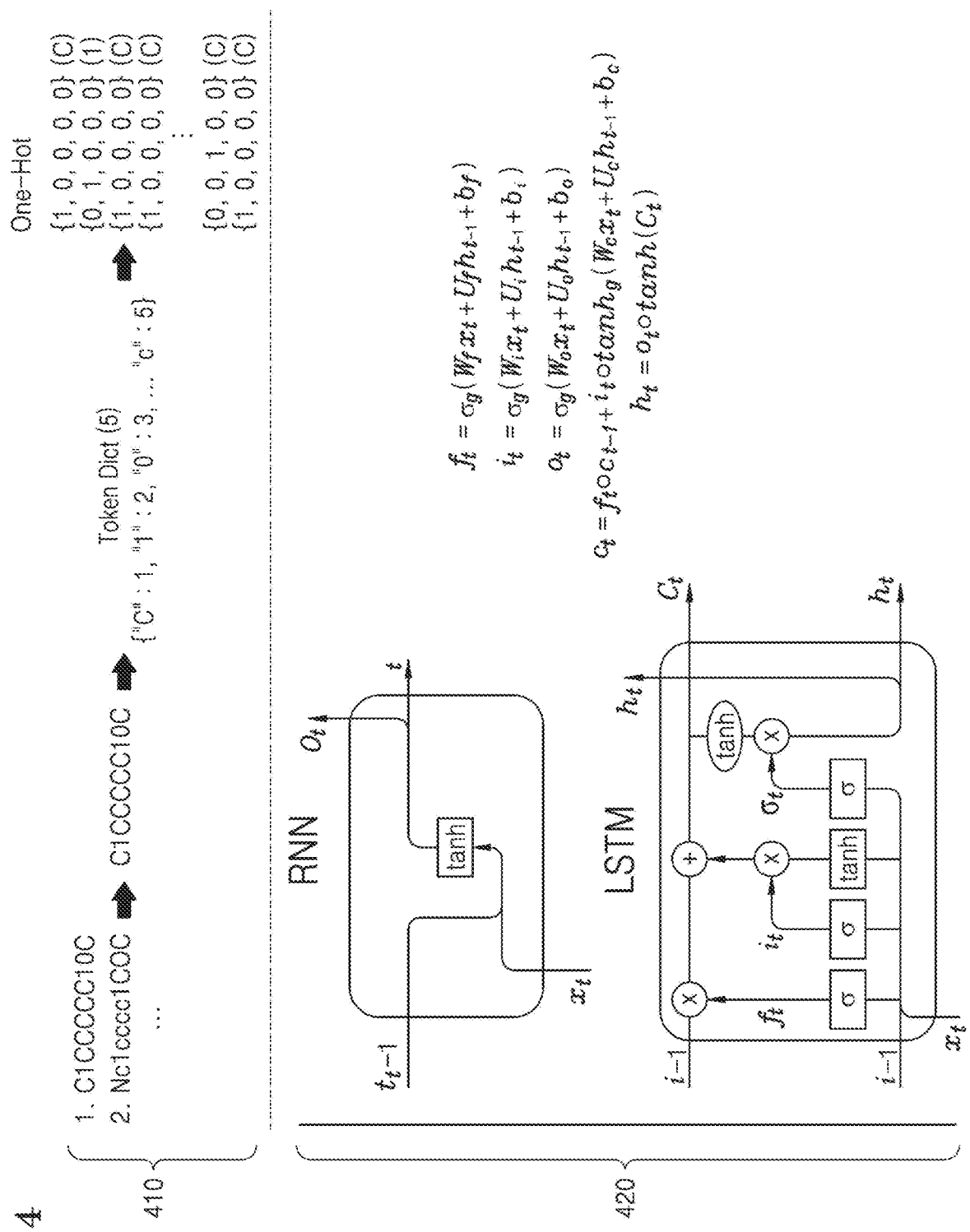
FIG. 4 shows a diagram illustrating a method of performing deep learning on a deep-learning model according to an embodiment of the present disclosure.

FIG. 4 shows a diagram illustrating a method of performing deep learning on a deep-learning model according to an embodiment of the present disclosure.

Referring to FIG. 4, a pre-processing process 410 of deep learning on a deep-learning model and a training process 420 of deep learning on the deep-learning model are illustrated.

In the pre-processing process 410, each of to-be-screened compounds in the commercially available compound database may be converted into a simplified molecular-input line-entry system (SMILES) string (e.g., C1CCCC1OC), and the SMILES string (e.g., C1CCCC1OC) may be one-hot encoded according to a token dictionary to be converted into a matrix form of one-hot vectors corresponding to each character. In the pre-processing process 410, compounds may be converted into a one-hot matrix form, and thus a deep learning process may be more smoothly performed thereafter.

After the pre-processing process 410, the deep learning may be performed on the deep-learning model in such a way that an output compound becomes similar to an input compound. That is, when generating the target deep-learning model, the processor 220 may perform the deep learning in such a way that the SMILES string of the output compound becomes similar to the SMILES string of the input compound. As described above, in the case where the deep-learning model is trained to generate the target deep-learning model, when a random vector is applied in a subsequent decoding process of the target deep-learning model, various novel compound structure equations, retaining structural specificity to the target protein 100, may be generated.

In the training process 420, to address the issue of gradient blowing up and vanishing by the RNN, a long short-term memory (LSTM) model may be used as the deep-learning model.

As illustrated, the LSTM model may operate, with respect to time points t and t−1, based on a forget gate $f_t$, an input gate $i_t$, and an output gate $O_t$, and the operator ○ may refer to a Hadamard product between matrices. The memory cell $C_t$ may be updated through the forget gate $f_t$ and the input gate $i_t$ operation procedures, and the hidden cell $h_t$ may be output by the updated memory cell $C_t$ and the output gate $O_t$.

Figure 5:
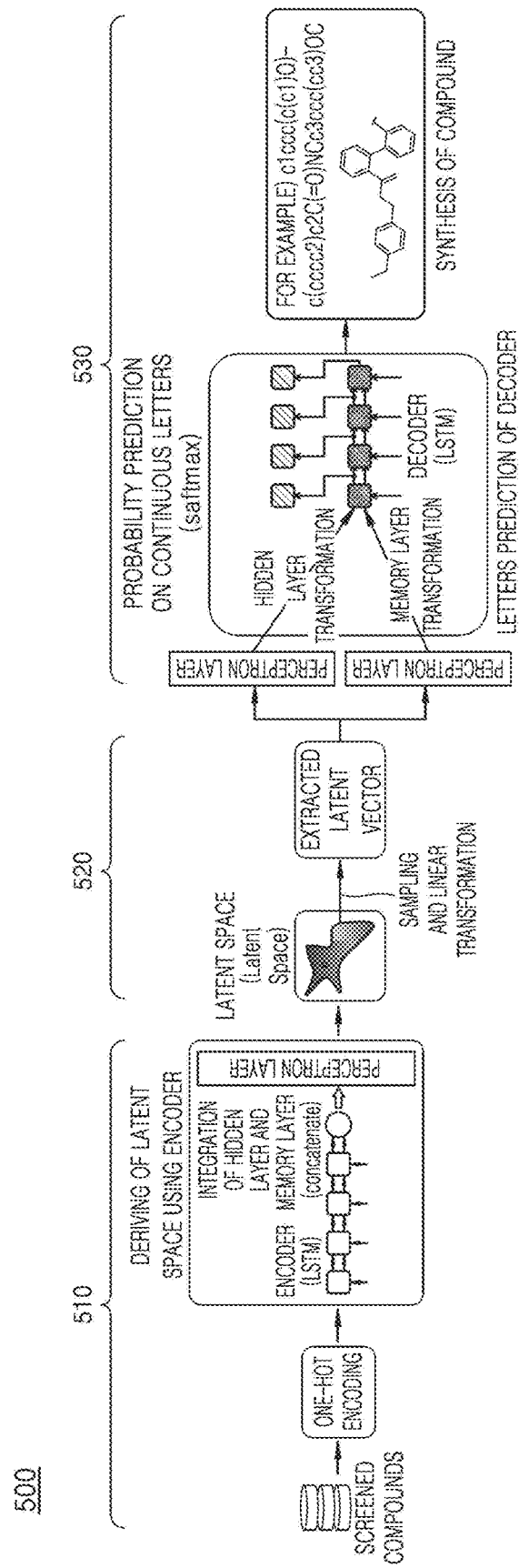
FIG. 5 shows a diagram illustrating a process of generating a target deep-learning model specific to a target protein according to an embodiment of the present disclosure.

FIG. 5 is a diagram illustrating an operation 500 of generating novel-compound candidates based on a target deep-learning model according to an embodiment of the present disclosure.

Referring to FIG. 5, in the operation 500 of generating novel-compound candidates by a target deep-learning model, an encoding process 510, a random vector setting process 520, and a decoding process 530 may be performed.

The operation 500 of generating the novel-compound candidates may be performed by an encoding module and a decoding module of a target deep-learning model. The target deep-learning model may receive the input of WP complementary compounds screened by the first WP screening to generate novel-compound candidates.

In detail, in the encoding process 510, WP complementary latent vectors for WP complementary compounds may be generated; in the random vector setting process 520, a latent space may be formed by WP complementary latent vectors; and in a decoding process 530, a novel compound may be generated by decoding a sum vector obtained by summing a WP complementary latent vector and a random vector.

In the random vector setting process 520, a modified latent vector may be extracted from a WP complementary latent space. That is, the processor 220 may form a latent space including WP complementary latent vectors of WP complementary compounds when generating novel-compound candidates, and transform a latent vector randomly extracted from the latent space into a random vector according to a Gaussian random distribution.

Since the latent vector may be randomly extracted from the latent space, and the extracted latent vector may be added as a random vector to the WP complementary latent vector to form a sum vector, such a random component may be reflected on the decoding process 530 to generate novel-compound candidates that are not present in existing commercially available compound database. Meanwhile, a degree of randomness such as a variance of a Gaussian random distribution, which is a criterion for extracting a random vector, may be adjusted as necessary.

Figure 6:
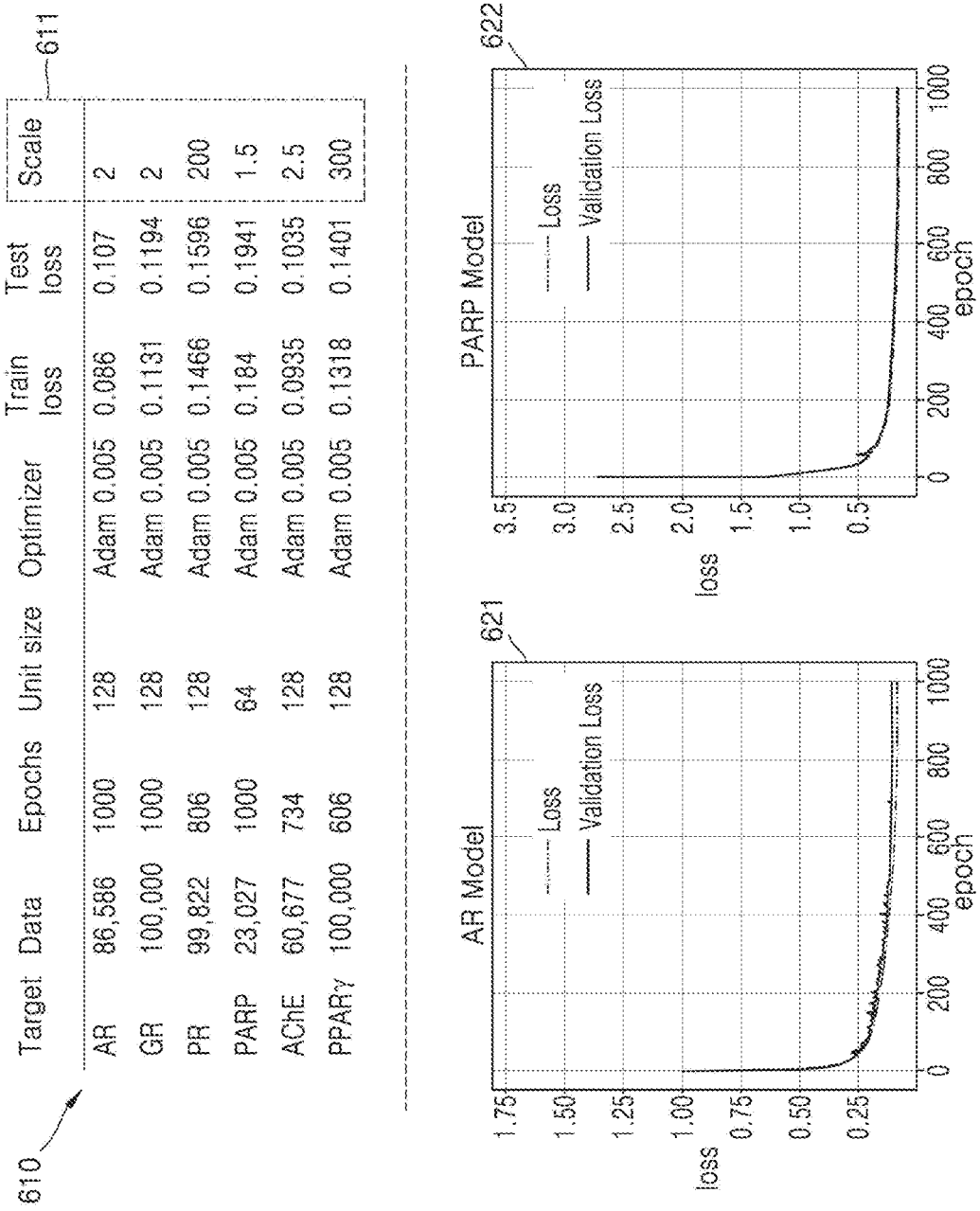
FIG. 6 shows a diagram illustrating a training process of a target deep-learning model according to an embodiment.

FIG. 6 shows a diagram illustrating a training process of a target deep-learning model according to an embodiment.

Referring to FIG. 6, illustrated are a table 610 showing details for generating a target deep-learning model by training a deep-learning model with respect to six kinds of target proteins 100, and graphs 621 and 622 showing a training progress degree of the deep-learning model according to a training period when AR and PARP are used as the target protein 100.

As shown in the table 610, for each of the six kinds of target proteins 100, the number (Data) of WP complementary compounds used as a learning target for deep learning, a training period (Epochs) of deep learning, a unit size, an optimizer of deep learning, a train loss, a test loss, and a scale 611 may be set, and according to such settings, deep learning may be performed to generate a target deep-learning model for each of the six kinds of target proteins 100.

The scale 611 may refer to a variable for adjusting a variance of a Gaussian random distribution that is a criterion for extracting a latent vector in the random vector setting process 520, and may be referred to as heat in other technical fields. That is, when setting as the random vector, the processor 220 may adjust the variance of the Gaussian random distribution based on diversity and validity of the novel-compound candidates.

In the table 610, when the target protein 100 is AR, the scale of 2 may be applied so that the variance of the Gaussian random distribution is increased twice, and thus, the diversity of novel-compound candidates generated by the target deep-learning model may be increased. Also, when the target protein 100 is PARP and PPARγ, it is confirmed that the number of novel-compound candidates that have the same structure is high. Accordingly, to prevent this phenomenon, the scale may be set to 200 and 300 as shown in FIG. 2.

As described above, since the variance of the Gaussian random distribution may be adjusted according to the kind of the target protein 100 by the scale 611, both diversity and structural validity of the novel-compound candidates may be determined to be in an appropriate range. Meanwhile, hereinbefore, only embodiments in which the scale 611 is set to a value greater than 1 to increase diversity have been presented. However, in the case where novel-compound candidates are variously generated and the compound structure validity is low, a scale value may be set to be less than 1.

In the graphs 621 and 622, in the case where the target protein 100 is AR and PARP, loss and validation loss according to a training epoch may converge. As a result, it may be verified that the target deep-learning model is properly generated, and since a loss is not reduced after 1,000 epochs, the training period may be set to be 1,000 epochs.

FIG. 7 shows a diagram illustrating the results of a first WP screening and a second WP screening according to some embodiments.

Referring to FIG. 7, a table 700 shows the results of a first WP screening (step 1), the results of the generation of novel-compound candidates (step 2) through the target deep-learning model, and the results of a second WP screening (step 3).

With respect to the case where the target protein 100 is PR, referring to a portion 710 of the table 700, in the first WP screening, the screening criteria determined by the tolerance and the matching number may be any one of three types, and a first criterion, i.e., 1.5 Å and the matching number of 4/6, are adopted to screen 99,821 WP complementary compounds from 12,954,474 commercially available compound database, and in this case, the hit rate may be 0.77. Meanwhile, as in step 2, 100,000 novel-compound candidates may be generated from 99,821 WP complementary compounds by the target deep-learning model.

In the case of PR, a second WP screening may be performed on 100,000 novel-compound candidates, wherein the screening criteria of the second WP screening may be different from those of the first WP screening. That is, when generating the library 300, the processor 220 may perform the second WP screening according to second screening criteria that are stricter than the first screening criteria of the first WP screening.

In an embodiment, referring to a portion 720 of the table 700, a second WP screening may be performed on 100,000 novel-compound candidates according to, in addition to the first screening criteria (1.5 Å and 4/6) of the first WP screening, a second screening criteria (1.5 Å and 5/6) or a second screening criteria (1.5 Å and 6/6) which are stricter than the first screening criteria.

This is because, by performing the first WP screening less strictly for the generation process of step 2 to ensure the number of WP complementary compounds to be in the range of 20,000 to 100,000, followed by performing the second WP screening more accurately, the library 300 may be more accurately generated.

Similarly, even in the case where the target protein 100 is AChE, as in a portion 730 of the table 700, the first WP screening is performed according to the first screening criteria (2.0 Å and 4/6), and as in a portion 740 of the table 700, the second WP screening may be performed according to the second screening criteria (2.0 Å and 5/6) or the second screening criteria (1.5 Å and 5/6).

Meanwhile, referring to portions 750 and 760 of table 700, it can be seen that the hit rate of the novel-compound candidates produced by the second WP screening is higher than the hit rate of the WP complementary compounds produced by the first WP screening. Such a result may mean that a compound produced by the device 200 has a higher WP feature similarity.

FIG. 8 shows a diagram illustrating a method of verifying novel target-specific compounds constituting a library 300 according to an embodiment of the present disclosure.

Referring to FIG. 8, illustrated are a table 810 showing docking scores for binding energies of novel target-specific compounds constituting the library 300 and a table 820 showing novelty based on a tanimoto coefficient.

Referring to table 810, the processor 220 may verify, by executing instructions stored in the memory 210, the ease of binding of novel compounds of the library 300 to the target protein 100 by comparing a first docking score of the target protein 100 with respect to active compounds, a second docking score of the target protein 100 with respect to decoy compounds, and a third docking score of the target protein 100 with respect to novel compounds of the library 300.

In addition, with reference to the table 820, the processor 220 may verify, by executing instructions stored in the memory 210, the novelty of novel compounds of the library 300 based on the tanimoto coefficients of the active compounds and the novel compounds of the library 300.

In table 810, with respect to each of the 6 kinds of the target proteins 100, the active compounds of directory of useful decoys (DUD) and the decoy compounds may be compared with the novel compounds of the library 300. The criteria for the comparison is binding energy with the target protein 100, and the binding energy may be calculated by a Glide docking score by Glide, which is a ligand-receptor docking program of Schrϕdinger Inc. Regarding the binding energy, a lower value, that is, the greater absolute value of the negative value indicates more ease of binding to the target protein 100.

In a portion 811 of the table 810, in the case where AR, GR, PR, PARP and AChE are provided as the target protein 100, it is confirmed that the average binding energy of the novel compounds of the library 300 is lower than the average binding energy of the decoy compounds, i.e., the novel compounds bind better to the target protein 100 than the decoy compounds.

In a portion 812 of the table 810, in the case where AR, GR, PR, and PARP are provided as the target protein 100, the case in which the maximum binding energy of the new compounds (Max Gen.) is smaller than that of an active compound (Max active), occurs once, three times, eight times, and once in AR, GR, PR, and PARP, respectively. That is, it is confirmed that some of the novel compounds generated by the device 200 have a stronger binding force than the active compound that most well binds to the target protein 100, and the device 200 may derive a significant result.

In the table 820, in the case where AR, GR, PR, and PARP are provided as the target protein 100, results of the novelty verification of the novel compounds of the library 300 and the active compounds of the DUD with respect to the target protein 100 may be confirmed based on the tanimoto coefficient of RDKit fingerprint and the tanimoto coefficient of Morgan fingerprint.

As in a portion 821 of table 820, it may be determined that when the tanimoto coefficient of RDKit fingerprint is lower than 0.7, novel compounds are novel relative to active compounds, and when the tanimoto coefficient of Morgan fingerprint is lower than 0.5, active compound are novel relative to novel compounds. As shown, it can be determined that in both RDKit fingerprint and Morgan fingerprint, over 97% of the novel compounds are novel relative to active compounds. That is, according to the device 200, compounds that have not been present, may be newly generated.

FIG. 9 shows a flowchart illustrating operations constituting a method of designing a target-specific drug according to an embodiment of the present disclosure.

Referring to FIG. 9, a method of designing a target-specific drug may include operations 910 through 940. However, the present disclosure is not limited thereto, and other general-purpose operations, in addition to the operations illustrated in FIG. 9, may be further included in the method of designing a target-specific drug.

The method of FIG. 9 may include operations processed in time series in the device 200 described with reference to FIGS. 1 through 8. Accordingly, the description of the device 200, which may be omitted hereinafter with respect to the method, may be equally applied to the method.

The method of generating the library of target-specific novel compounds for the development of novel drug may be performed by the processor 220 executing instructions stored in the memory 210.

In operation 910, the device 200 may generate a WP model by identifying hydration sites at a binding site of the target protein 100 through molecular dynamics simulation.

The device 200 may calculate the thermodynamic properties of the hydration sites when generating the WP model and may assign WP features to the hydration sites based on the thermodynamic properties.

The thermodynamic properties may include the energy properties, entropy properties, and hydrogen bonding properties of the hydration sites, and the WP features may include positive charge features, negative charge features, hydrophobic features, aromatic features, a hydrogen bond acceptor, and a hydrogen bond donor.

In operation 920, the device 200 may perform a first WP screening on commercially available compound database based on a WP model to screen WP complementary compounds that are capable of complementarily binding to a binding site of the target protein 100.

When screening WP complementary compounds, the device 200 may perform a first WP screening based on the tolerance and matching number of the WP features.

The tolerance and the matching number may be adjusted such that WP complementary compounds are screened in the number being equal to or greater than 20,000 and equal to or less than 100,000 depending on the kind of the target protein 100.

In operation 930, the device 200 may perform, using WP complementary compounds as a learning target, deep-learning with respect to a deep-learning model that encodes an input compound into a latent vector and decodes the latent vector into an output compound, to generate a target deep-learning model that is trained specifically to the target protein 100.

That is, when generating the target deep-learning model, the device 200 may perform the deep learning in such a way that the SMILES string of the output compound becomes similar to the SMILES string of the input compound.

In operation 940, the device 200 may decode, using the target deep-learning model, a sum vector obtained by summing the WP complementary latent vector and the random vector of each of the WP complementary compounds to generate novel-compound candidates.

The device 200 may form a latent space including WP complementary latent vectors of WP complementary compounds when generating novel-compound candidates, and may set a latent vector extracted from the latent space according to a Gaussian random distribution as a random vector.

That is, when setting as the random vector, the device 200 may adjust the variance of the Gaussian random distribution based on the diversity and validity of the novel-compound candidates.

In operation 950, the device 200 may perform a second WP screening on the novel-compound candidates based on the WP model to generate the library 300 that is formed specifically to the target protein 100.

That is, when generating the library 300, the device 200 may perform the second WP screening according to second screening criteria that are stricter than the first screening criteria of the first WP screening.

The device 200 may verify ease of binding of the novel compounds of the library 300 to the target protein 100 by comparing a first docking score of the target protein 100 with respect to active compounds, a second docking score with respect to decoy compounds, and a third docking score with respect to novel compounds of the library 300, and the novelty of novel compounds of the library 300 may be verified based on the tanimoto coefficients of active compounds and novel compounds of the library 300.

In one or more embodiments, the target protein 100 may have the crystal structure of any one of androgen receptor (AR), glucocorticoid receptor (GR), progesterone receptor (PR), poly ADP-ribose polymerase (PARP), acetylcholinesterase (AChE), and peroxisome proliferator-activated receptor-gamma (PPARγ).

The method of FIG. 9 may be recorded on a computer-readable recording medium on which at least one program or software including instructions for executing the method is recorded.

Examples of the computer-readable recording medium may include magnetic media such as a hard disk, a floppy disk, and a magnetic tape, optical media such as a compact disk read only memory (CD-ROM) and a digital versatile disk (DVD), magneto-optical media such as a floptical disk, and hardware devices such as a read only memory (ROM), a random access memory (RAM), and a flash memory, which are specially configured to store and execute program commands. Examples of program instructions may include high-level language codes that can be executed by a computer using an interpreter as well as machine language codes such as those produced by a compiler.

According to the present disclosure, since the first WP screening can be performed through the WP model generated by hydration sites, unlike pharmacopore models, WP complementary compounds capable of binding to the target protein can be selected without information on the active compounds of the target protein.

In addition, a target deep-learning model specific to a target protein can be generated by deep learning that is performed using WP complementary compounds as a learning target, and novel compounds can be generated by applying a random vector to the target deep-learning model. Accordingly, validity and diversity of novel compounds can be adjusted within a suitable range by controlling the variance of the random vector.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A device for designing a target-specific drug, the device comprising:
a memory to store instructions; and
a processor configured to, by executing the instructions:
construct a water pharmacophore (WP) model by identifying hydration sites at a binding site of a target protein through molecular dynamics simulation,
perform a first WP screening on commercially available compound database based on the WP model to screen WP complementary compounds that are capable of complementarily binding to the binding site of the target protein;
construct a target deep-learning model that is trained specifically to the target protein, by performing deep learning, using the WP complementary compounds as a learning target, on a deep-learning model which encodes an input compound into a latent vector and decodes the latent vector into an output compound;
generate novel-compound candidates by decoding a sum vector obtained by summing a WP complementary latent vector and a random vector of each of the WP complementary compounds through the target deep-learning model; and
generate a library that is formed specifically to the target protein, by performing a second WP screening on the novel-compound candidates based on the WP model.

2. The device of claim 1, wherein
the processor is further configured to, when constructing the WP model,
calculate thermodynamic properties of the hydration sites, and
assign WP features to the hydration sites based on the thermodynamic properties.

3. The device of claim 2, wherein
the thermodynamic properties comprise energy properties, entropy properties, and hydrogen bonding properties of the hydration sites, and
the WP features comprise a positive charge feature, a negative charge feature, a hydrophobic feature, an aromatic feature, a hydrogen bond acceptor, and a hydrogen bond donor.

4. The device of claim 2, wherein
the processor is further configured to, when screening the WP complementary compounds, perform a first WP screening based on a tolerance and a matching number of the WP features.

5. The device of claim 4, wherein
the tolerance and the matching number are adjusted such that the WP complementary compounds are screened in such a number that is equal to or greater than 20,000 and equal to or less than 100,000 depending on the kind of the target protein.

6. The device of claim 1, wherein the processor is further configured to, when constructing the target deep-learning model, build such that a SMILES string of the output compound becomes as identical to possible to a SMILES string of the input compound, and the training is considered successful when a reconstruction loss, which quantifies a difference between the two SMILES strings, decreases and converges to a specific value.

7. The device of claim 1, wherein
the processor is configured to, when generating the novel-compound candidates,
form a latent space including WP complementary latent vectors of the WP complementary compounds, and
sum a latent vector randomly extracted from the latent space and the random vector.

8. The device of claim 7, wherein
the processor is further configured to, when setting as the random vector,
adjust a variance of a Gaussian random distribution based on diversity and validity of the novel-compound candidates.

9. The device of claim 1,
wherein a screening criteria of the first WP screening and a screening criteria of the second WP screening are determined based on an allowable proximity distance of WP features and a number of matches of WP features, and
wherein the screening criteria of the second WP screening has a smaller allowable proximity distance or a greater number of matches than the screening criteria of the first WP screening.

10. The device of claim 1, wherein
the processor is, by executing the instructions, further configured to:
verify ease of binding of novel compounds of the library to the target protein by comparing a first docking score with respect to the active compounds of the target protein, a second docking score with respect to decoy compounds, and a third docking score with respect to the novel compounds of the library, and
verify novelty of the novel compounds of the library based on a tanimoto coefficient of active compounds and a tanimoto coefficient of the novel compounds of the library.

11. The device of claim 1, wherein
the target protein has the crystal structure of any one of androgen receptor (AR), glucocorticoid receptor (GR), progesterone receptor (PR), poly ADP-ribose polymerase (PARP), acetylcholinesterase (AChE), and peroxisome proliferator-activated receptor-gamma (PPARγ).

12. A method of designing a target-specific drug, which is performed by a processor executing instructions stored in a memory, the method comprising:
constructing a water pharmacophore (WP) model by identifying hydration sites at a binding site of a target protein through molecular dynamics simulation;
performing a first WP screening on commercially available compound database based on the WP model to screen WP complementary compounds that are capable of complementarily binding to the binding site of the target protein;
constructing a target deep-learning model that is trained specifically to the target protein, by performing deep learning, using the WP complementary compounds as a learning target, on a deep-learning model which encodes an input compound into a latent vector and decodes the latent vector into an output compound;
generating novel-compound candidates by decoding a sum vector obtained by summing a WP complementary latent vector and a random vector of each of the WP complementary compounds through the target deep-learning model; and generating a library that is formed specifically to the target protein, by performing a second WP screening on the novel-compound candidates based on the WP model.

* * * * *